US008749192B2

(12) United States Patent
Li et al.

(10) Patent No.: US 8,749,192 B2
(45) Date of Patent: Jun. 10, 2014

(54) ELECTRIC MOTOR AND ELECTRIC GENERATOR

(75) Inventors: Yi Li, Edinburgh (GB); Jonathan Richard Meyer, Farnham (GB); Rupert Paul Kirby, Hants (GB); Timothy John Martin, Tilehurst (GB)

(73) Assignee: Protean Electric Limited (GB)

( * ) Notice: Subject to any disclaimer, the term of this patent is extended or adjusted under 35 U.S.C. 154(b) by 0 days.

(21) Appl. No.: 12/837,470

(22) Filed: Jul. 15, 2010

(65) Prior Publication Data
US 2011/0050138 A1 Mar. 3, 2011

Related U.S. Application Data

(63) Continuation of application No. PCT/IB2010/053132, filed on Jul. 8, 2010.

(30) Foreign Application Priority Data

Sep. 3, 2009 (GB) .................................. 0915356

(51) Int. Cl.
*H02P 23/00* (2006.01)
(52) U.S. Cl.
USPC ........................................ 318/799; 318/803
(58) Field of Classification Search
USPC ................. 318/803, 805, 811, 599, 799
See application file for complete search history.

(56) References Cited

U.S. PATENT DOCUMENTS

| 4,455,522 A * | 6/1984 | Lipo ............................. 318/809 |
| 4,716,329 A * | 12/1987 | Oh ................................ 310/183 |
| 4,862,343 A * | 8/1989 | Nomura et al. ................. 363/41 |
| 5,414,339 A * | 5/1995 | Masaki et al. ................ 318/800 |
| 5,705,909 A * | 1/1998 | Rajashekara ................. 318/801 |
| 5,898,988 A * | 5/1999 | Horski ............................ 29/596 |
| 6,049,153 A * | 4/2000 | Nishiyama et al. ..... 310/216.009 |
| 6,121,707 A * | 9/2000 | Bell et al. ....................... 310/179 |
| 6,236,583 B1 * | 5/2001 | Kikuchi et al. ............... 363/132 |
| 6,984,909 B2 * | 1/2006 | Kadoya et al. ................ 310/185 |
| 7,126,309 B1 * | 10/2006 | Takeuchi et al. .............. 318/811 |
| 7,276,832 B2 * | 10/2007 | Miyashita et al. ..... 310/216.094 |
| 2004/0021437 A1 | 2/2004 | Maslov |
| 2007/0284157 A1 | 12/2007 | Heller |

FOREIGN PATENT DOCUMENTS

| GB | 2456351 | | 7/2009 |
| JP | 2005-039932 | * | 2/2005 |
| WO | WO9414226 | | 6/1994 |
| WO | WO2004073157 | | 8/2004 |

OTHER PUBLICATIONS

English translation for Japanese document JP-2005-039932, 8 pages, Apr. 5, 2012.*
Search report Dec. 18, 2009 for application GB0915356.0.
Office Action Mar. 9, 2010 for GB application GB0915356.0.

* cited by examiner

*Primary Examiner* — Rina Duda
(74) *Attorney, Agent, or Firm* — The Mason Group Patent Specialists LLC; Valerie M. Davis

(57) ABSTRACT

An electric motor comprising a stator having two coil sets arranged to produce a magnetic field of the motor, each coil set comprising a plurality of coil sub-sets; and two control devices, wherein the first control device is coupled to the plurality of coil sub-sets for the first coil set and the second control device is coupled to the plurality of coil sub-sets for the second coil set and each control device is arranged to control current in the respective plurality of coil sub-sets to generate a magnetic field in each coil sub-set to have a substantially different magnetic phase to the other one or more coil sub-sets in the respective coil set; and wherein the first control device and the second control device are mounted adjacent to the stator.

19 Claims, 6 Drawing Sheets

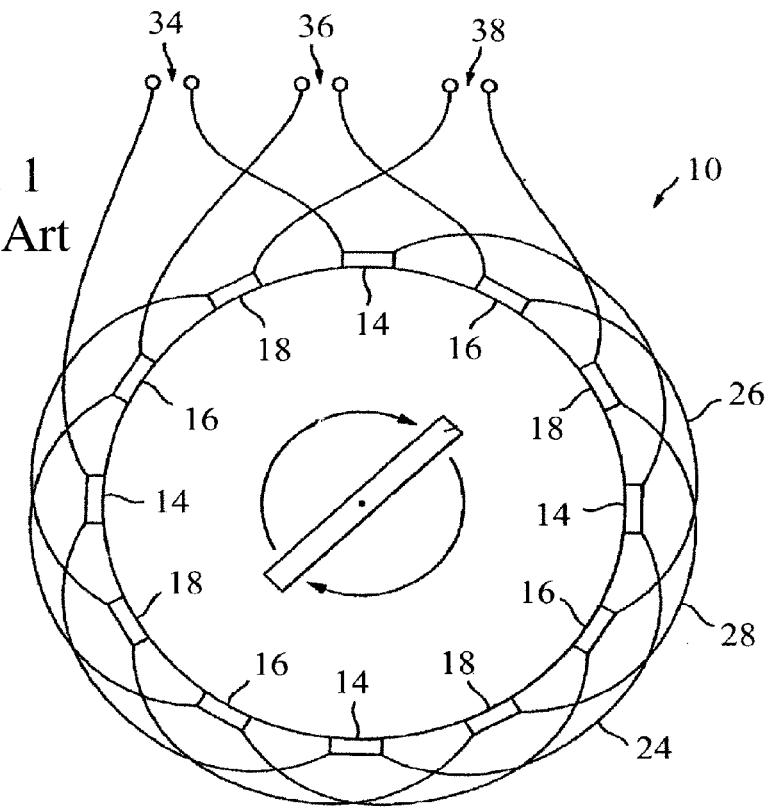
Fig. 1
Prior Art
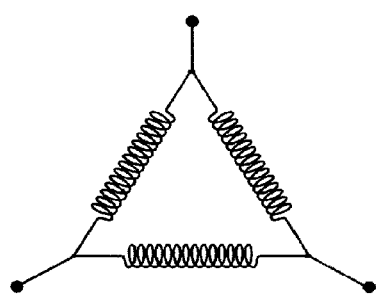
Fig. 2
Prior Art
Fig. 3
Prior Art

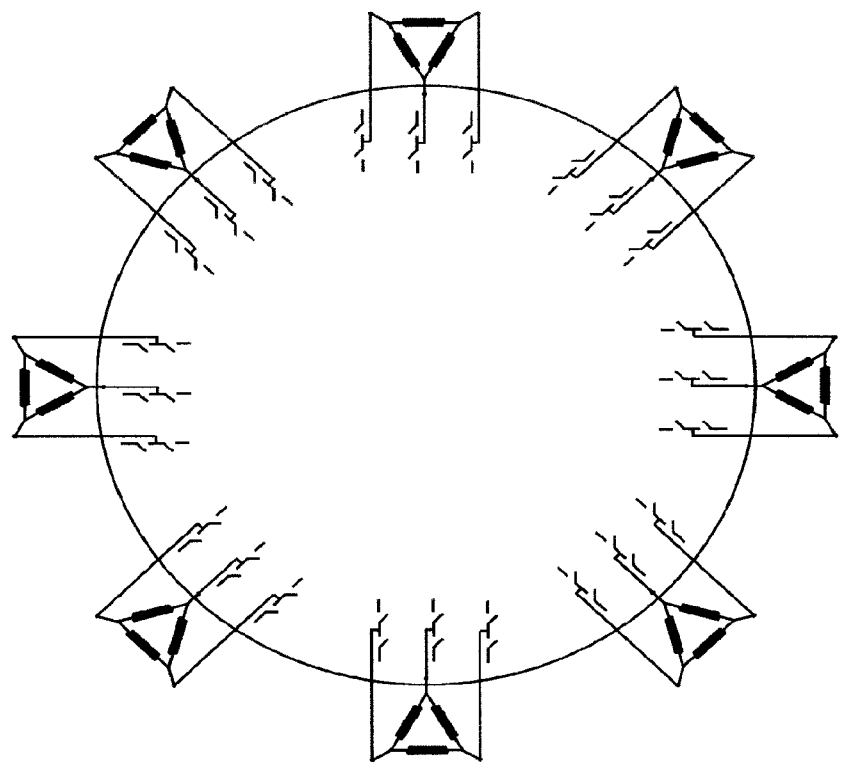
Fig. 8    40
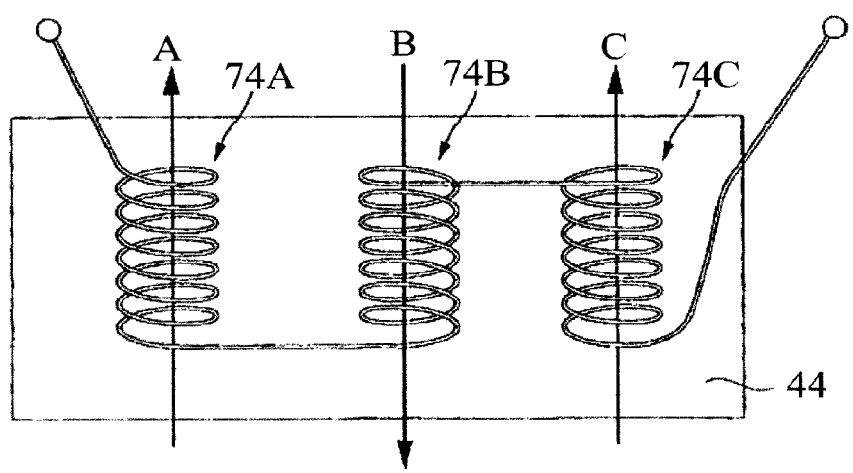
Fig. 9

ELECTRIC MOTOR AND ELECTRIC GENERATOR

This application claims priority from United Kingdom Application No. GB0915356.0, filed on Sep. 3, 2009 and as a continuation application from PCT Application No. PCT/IB2010/053132, filed on Jul. 8, 2010, all of which are hereby incorporated by reference as if fully set forth herein.

The present invention relates to an electric motor and electric generator and in particular an in-wheel electric motor and in-wheel electric generator.

Electric motor systems typically include an electric motor and a control unit arranged to control the power of the electric motor. Examples of known types of electric motor include the induction motor, synchronous brushless permanent magnet motor, switched reluctance motor and linear motor. In the commercial arena three phase electric motors are the most common kind of electric motor available.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

By way of illustration, FIG. 1 shows a typical three phase electric motor 10 having three coil sets 14, 16, 18. Each coil set consists of four coil sub-sets that are connected in series. Accordingly, for a given coil set the magnetic field generated by the respective coil sub-sets will have a common phase.

The three coil sets of a three phase electric motor are typically configured in either a delta or wye configuration, where a delta configuration is illustrated in FIG. 2 and a wye configuration is illustrated in FIG. 3.

A control unit for a three phase electric motor having a DC power supply will typically include a three phase bridge inverter that generates a three phase voltage supply for driving the electric motor. Each of the respective voltage phases is applied to a respective coil set of the electric motor.

A three phase bridge inverter includes a number of switching devices, for example power electronic switches such as Insulated Gate Bipolar Transistor (IGBT) switches.

However, power electronic switches will typically exhibit switching losses and conduction losses.

Including switching losses and conduction losses, the total losses are approximately proportional to the square of the power. This imposes serious thermal management problems for the motor and inverter since, for example, a doubling of the power leads to a fourfold increase in thermal losses. Extracting this heat without elevating the temperature of the device above its safe operating level becomes the limiting factor in what power the device can handle. Indeed, today larger power devices having intrinsic current handling capabilities of, for example, 500A are restricted to 200A due to thermal constraints.

For a conventional three phase motor with a given power rating, if a larger power rating is desired this can be achieved by producing a motor with a larger diameter. For a larger motor diameter, the peripheral speed of the rotor increases for a given angular velocity. For a given supply voltage this requires that the motor coils to have a reduced number of turns. This is because the induced voltage is a function of the peripheral speed of the rotor and the number of turns in the coils. The induced voltage must always be at or below the supply voltage.

However, the reduced number of turns in the coils leads to a reduced inductance for the motor, since the inductance of the motor is proportional to the square of the number of turns.

For an electric motor of given size and construction, inductance is governed by ampere/turns, where inductance is limited by a combination of the maximum current in the conductor that can be adequately cooled and the maximum number of turns that can be fitted inside the electric motor.

Almost all electronic control units for electric motors, such as the three phase bridge inverter, use some form of pulse width modulation (PWM) voltage for controlling the torque of a motor. PWM control works by using the motor inductance to average out an applied pulse voltage to drive the required current into the motor coils. Using PWM control an applied voltage is switched across the motor windings. During this on period, the current rises in the motor winding at a rate dictated by its inductance and the applied voltage. The PWM control is then required to switch off before the current has changed too much so that precise control of the current is achieved.

In accordance with an aspect of the present invention there is provided an electric motor and electric generator according to the accompanying claims.

An electric motor comprising a plurality of coil sets arranged to produce a magnetic field of the motor, each coil set comprising a plurality of coil sub-sets; and a plurality of control devices, wherein each of the control devices are coupled to a respective plurality of coil sub-sets of the coil sets and each control device is arranged to control current in the respective plurality of coil sub-sets to generate a magnetic field in each coil sub-set to have a substantially different magnetic phase to the other one or more coil sub-sets in the coil set.

The present invention allows an electric motor to have a number of sub-motors that can operate independently of each other, via their respective control device.

Accordingly, the current flow in the coil sub-sets of one coil set is independent of the current flow in the coil sub-sets of another coil set (i.e. the respective coil sub-sets are not connected in series). Consequently, the coils of each coil sub-set can have a larger number of turns than for an equivalent motor in which all respective coil sub-sets are connected in series. The increased number of turns in each coil increases the overall inductance of the motor. This means that lower currents can be used in the coils of each coil sub-set, which leads to fewer heat dissipation problems, and which allows smaller switching devices to be used. The use of smaller switching devices in turn allows for faster switching speeds and lower switching losses.

Further, as the coils of a coil sub-set are arranged to form a multi-phase electric motor (i.e. forms a logical sub-motor) the coils of a coil sub-set can be configured either in a delta or wye configuration as best fits the specific electric motor requirements.

The respective control devices, otherwise known as drive units, include an inverter having a plurality of switches for applying a pulse width modulated (PWM) voltage to the plurality of respective coil sub-sets, which is used to control current within the coils of the coil sub-set. PWM control of the currents in the motor coils can be enhanced due to the increased number of turns that can be included in the coils. As smaller switching device can be used, significant savings in cost, weight and heat dissipation can be made.

Since smaller components (e.g. switching devices) can be used within the control devices they can be housed within a casing of the motor. For example, the control devices can be located adjacent the coil sub-sets of the respective coil set within the motor thereby simplifying termination of the coil windings. The casing of the motor can include one or more apertures dimensioned such that the control devices can be accessed one at a time, depending on the orientation of the rotor/casing and the control devices.

A common control device can be provided to coordinate the operation of the plurality of control devices, thereby allowing the independent sub-motors of the electric motor to be centrally controlled. Accordingly, the common control device can be operable to selectively disable one or more of the control devices to allow fractional power operation or to adjust the power of one sub-motor to compensate for a fault in another sub-motor.

An electric motor having parallel sub-motors reduces current per coil set compared to an electric motor having serially coupled coil sets.

Further by having the control devices for each sub motor located within the electric motor assembly, with associated capacitance also located within the electric motor assembly, reduces the capacitance requirements for the electric motor.

The present invention will now be described, by way of example, with reference to the accompanying drawings, in which:

FIG. 1 schematically shows an example of three phase motor arrangement;

FIG. 2 illustrates a three phase motor delta coil wiring arrangement;

FIG. 3 illustrates a three phase motor wye coil wiring arrangement;

Figure 6:
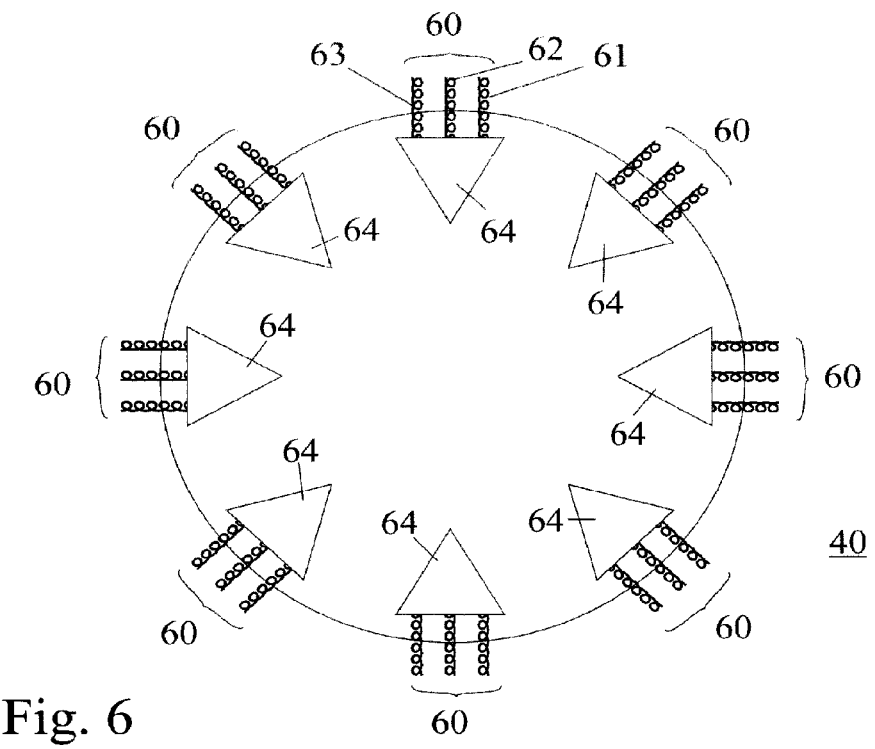
Figure 7:
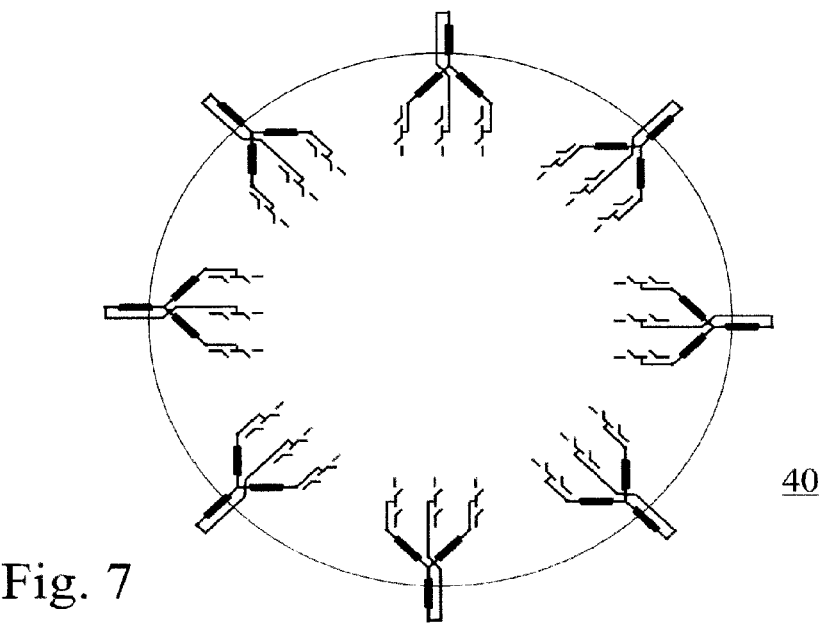
Figure 10:
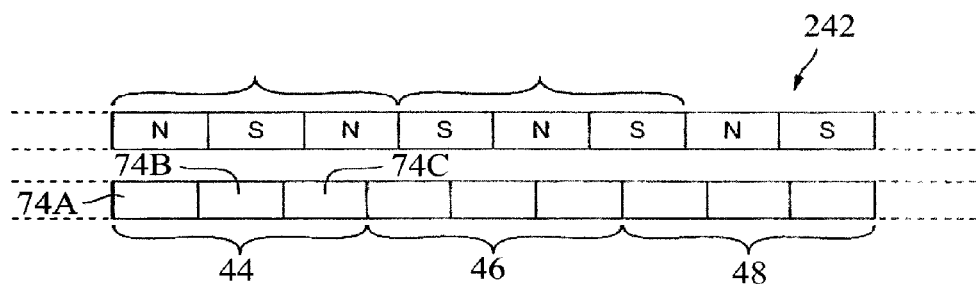
Figure 11:
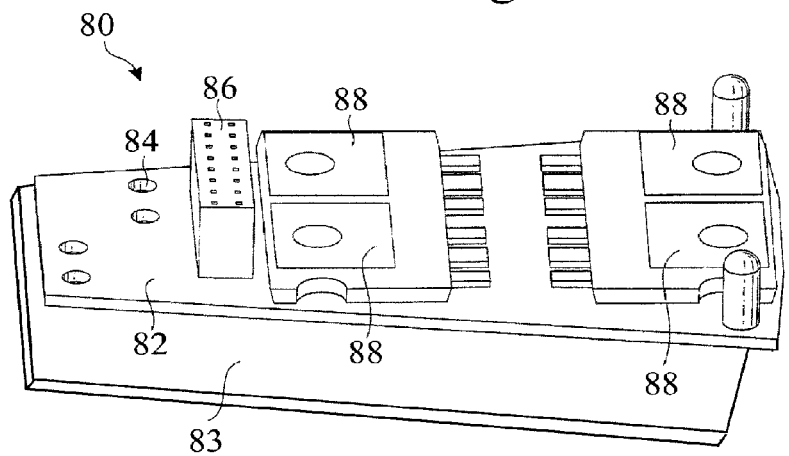
Figure 12:
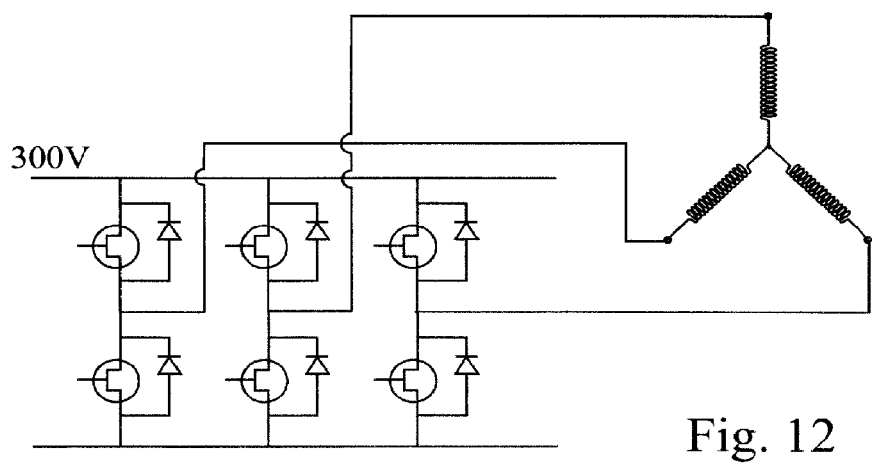

FIG. 6 schematically shows an example arrangement of coil sets for an electric motor according to an embodiment of the present invention;

FIG. 7 schematically illustrates the coils sub-sets of an electric motor according to an embodiment of the present invention that are configured in a wye configuration;

FIG. 8 schematically illustrates the coils sub-sets of an electric motor according to an embodiment of the present invention that are configured in a delta configuration;

FIG. 9 schematically shows an example arrangement of coils in one of the coil sub-sets according to an embodiment of the present invention;

FIG. 10 schematically shows the coils of the embodiment in relation to the magnets;

FIG. 11 schematically shows an example of a control device in accordance with an embodiment of the present invention; and FIG. 12 is a circuit diagram of the switching arrangement.

The embodiment of the invention described is an electric motor for use in a wheel of a vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. In addition, some of the aspects of the invention are applicable to an arrangement having the rotor centrally mounted within radially surrounding coils.

Figure 4:
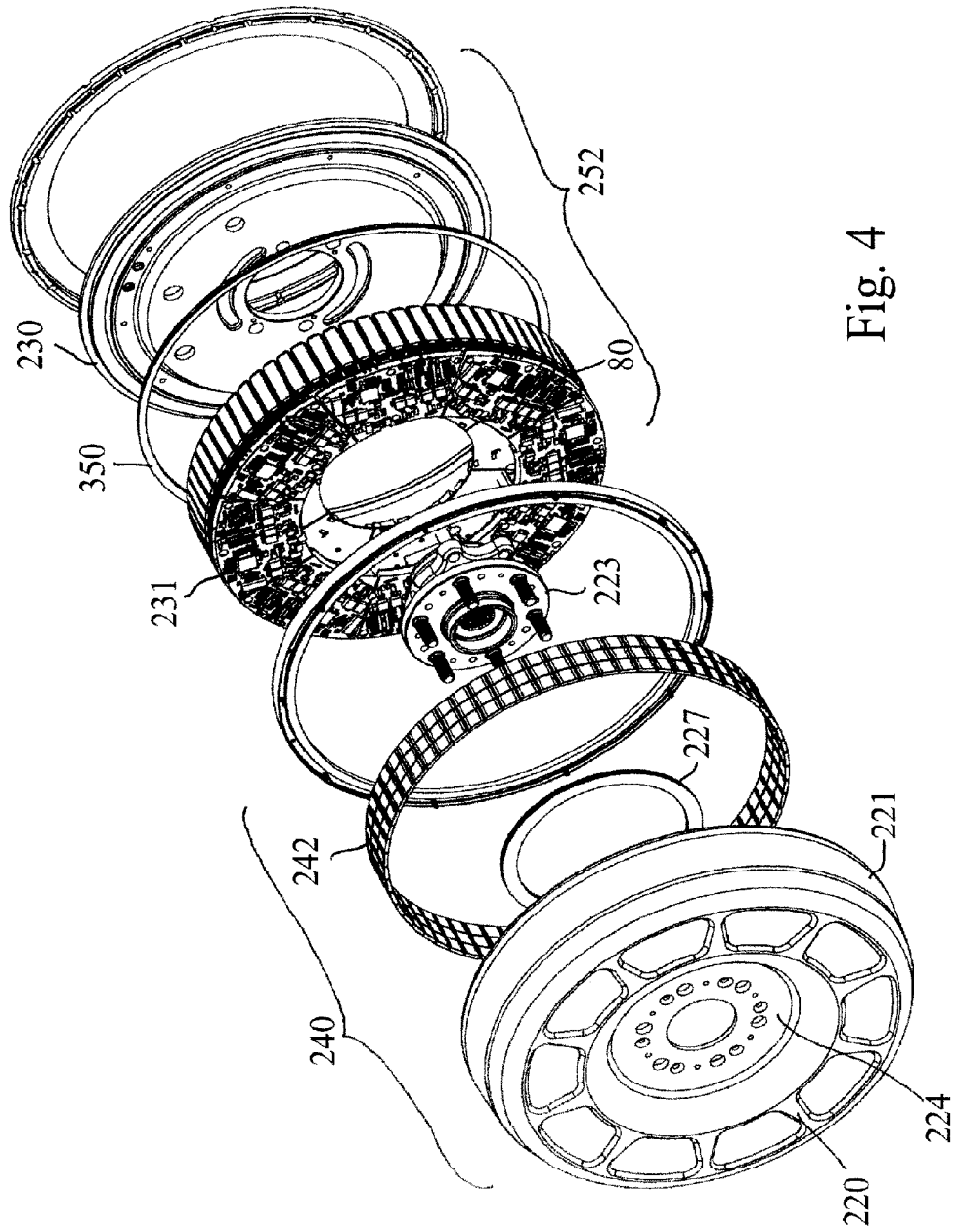
FIG. 4 illustrates an exploded view of a motor embodying the present invention.
Figure 5:
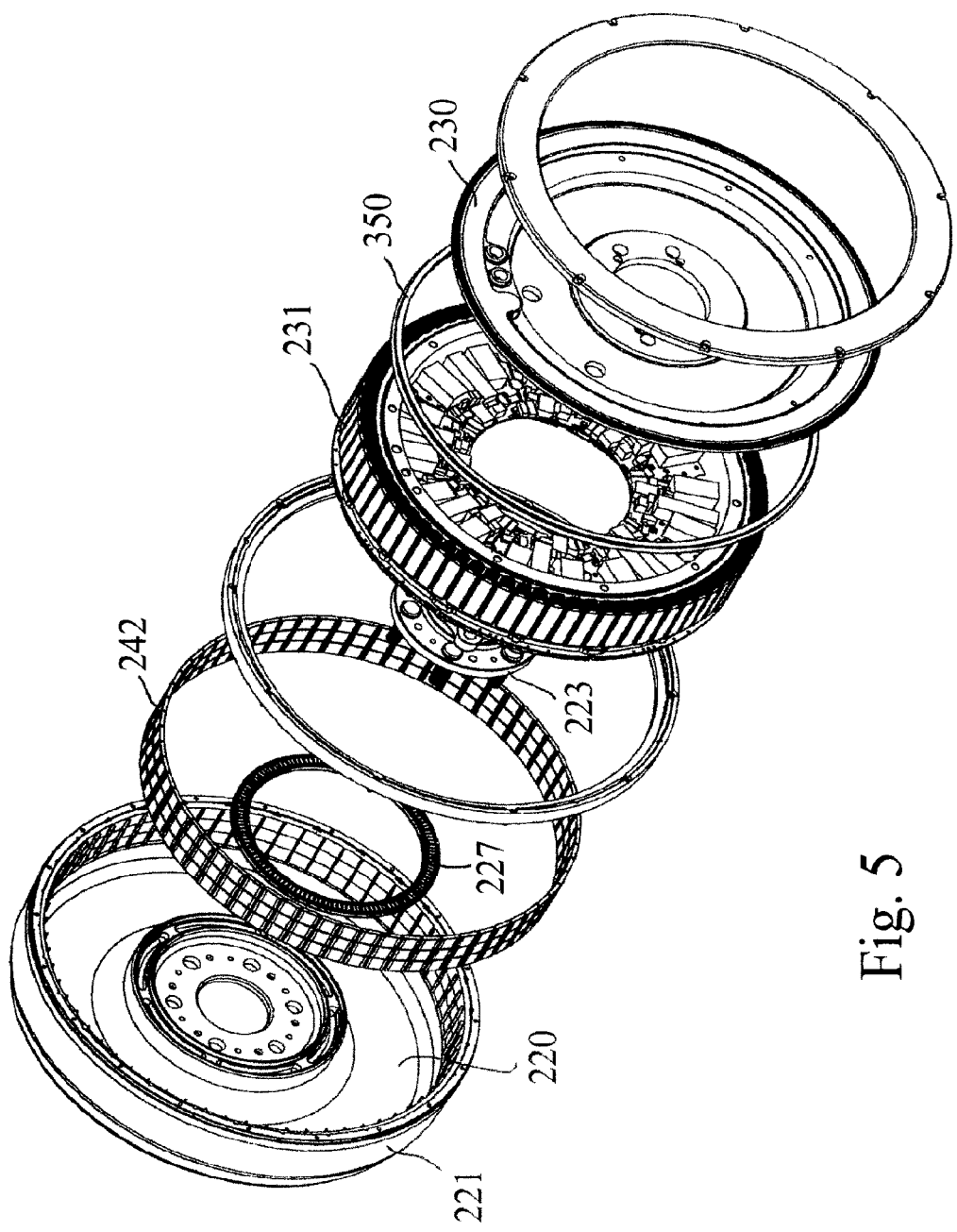
FIG. 5 is an exploded view of the motor of FIG. 3 from an alternative angle.

The physical arrangement of the embodying assembly is best understood with respect to FIGS. 4 and 5. The assembly can be described as a motor with built in electronics and bearing, or could also be described as a hub motor or hub drive as it is built to accommodate a separate wheel.

Referring first to FIG. 4, the assembly comprises a stator 252 comprising a rear portion 230 forming a first part of the housing of the assembly, and a heat sink and drive arrangement 231 comprising multiple coils and electronics to drive the coils as well as a heat sink. The coil drive arrangement 231 is fixed to the rear portion 230 to form the stator 252 which may then be fixed to a vehicle and does not rotate during use. The coils themselves are formed on tooth laminations which together with the drive arrangement 231 and rear portion 230 form the stator 252.

Although not shown, also mounted to the stator are a plurality of capacitor circuit boards for providing capacitance between the electric motor and the voltage supply to reduce voltage line drop.

A rotor 240 comprises a front portion 220 and a cylindrical portion 221 forming a cover, which substantially surrounds the stator 252. The rotor includes a plurality of magnets 242 arranged around the inside of the cylindrical portion 221. The magnets are thus in close proximity to the coils on the assembly 231 so that magnetic fields generated by the coils in the assembly 231 generate a force on the magnets 242 arranged around the inside of the cylindrical portion 221 of the rotor 240 thereby causing the rotor 240 to rotate.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has a significant advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. A first advantage of this arrangement is that the whole assembly may be simply retrofitted to an existing vehicle by removing the wheel, bearing block and any other components such as the braking arrangement. The existing bearing block can then fitted inside the assembly and the whole arrangement fitted to the vehicle on the stator side and the normal rim and wheel fitted to the rotor so that the rim and wheel surrounds the whole motor assembly. Accordingly, retrofitting to existing vehicles becomes very simple.

A second advantage is that there are no forces for supporting the vehicle on the outside of the rotor 240, particularly on the circumferential wall 221 carrying the magnets on the inside circumference. This is because the forces for carrying the vehicle are transmitted directly from the suspension fixed to one side of the bearing block (via the central portion of the stator wall) to the central portion of the wheel surrounding the rotor fixed to the other side of the bearing block (via the central portion of the rotor wall). This means that the circumferential wall 221 of the rotor is not subject to any forces that could deform the wall thereby causing misalignment of the magnets. No complicated bearing arrangement is needed to maintain alignment of the circumferential rotor wall.

The rotor also includes a focussing ring and magnets 227 for position sensing discussed later.

FIG. 5 shows an exploded view of the same assembly as FIG. 4 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block 223 at the central portions of the rotor and stator walls.

Additionally shown in FIG. 4 are control devices 80, otherwise known as motor drive circuits, carrying control electronics described below. Additionally in FIGS. 4 and 5 a V shaped seal 350 is provided between the circumferential wall 221 of the rotor and the outer edge of the stator housing 230. Further, in FIG. 5, the magnetic ring 227 comprising a commutation focusing ring and a plurality of magnets is provided for the purpose of indicating the position of the rotor with respect to the stator to a series of sensors arranged on the control devices 80 of the stator 252.

FIG. 6 schematically shows an example of an electric motor 40 in accordance with an embodiment of this invention. In this example, the motor is generally circular. However, it will be appreciated that embodiments of this invention can employ other topologies. For example a linear arrangement of coils for producing linear movement is envisaged.

The motor 40 in this example includes 8 coil sets 60 with each coil set 60 having three coil sub-sets 61, 62, 63 that are coupled to a respective control device 64, where each control device 64 and respective coil sub-sets form a three phase logical or sub electric motor that can be controlled independently of the other sub motors. The control devices 64 drive their respective sub motor with a three phase voltage supply, thereby allowing the respective coil sub-sets to generate a rotating magnetic field. Although the present embodiment describes each coil set 60 as having three coil sub-sets 61, 62, 63, the present invention is not limited by this and it would be appreciated that each coil set 60 could have two or more coil sub-sets. Equally, although the present embodiment describes an electric motor having eight coil sets 60 (i.e. eight sub motors) the motor could have two or more coil sets with associated control devices (i.e. two or more sub motors).

The motor 40 can include a rotor (not shown in FIG. 6) positioned in the centre of the circle defined by the positioning of the various coils of the motor, thereby to allow rotation of the rotor within the rotating magnetic field produced by the coils. Preferably, though, the rotor is arranged around the coils as previously disclosed in FIGS. 4 and 5. The rotor may typically comprise one or more permanent magnets arranged to rotate such that their poles sweep across the ends of the coils of the motor 40. Appropriate switching of currents in the coils of the coil sub-sets 61, 62, 63 allows synchronized attraction and repulsion of the poles of the permanent magnet of the rotor to produce the rotating action of the motor 40. It will be appreciated that FIG. 6 is highly schematic and, in practice, the coil sub-sets will be arranged at the outer periphery of the stator with the rotor magnets surrounding the coils.

Each control device includes a three phase bridge inverter which, as is well known to a person skilled in the art, contains six switches. The three phase bridge inverter is coupled to the three subset coils of a coil set 60 to form a three phase electric motor configuration.

Accordingly, as stated above, the motor includes eight three phase sub-motors, where each three phase sub-motor includes a control device 64 coupled to the three sub-set coils of a coil set 60.

Each three phase bridge inverter is arranged to provide PMW voltage control across the respective coil sub-sets 61, 62, 63 to provide a required torque for the respective sub-motors.

For a given coil set the three phase bridge switches of a control device 64 are arranged to apply a single voltage phase across each of the coil sub-sets 61, 62, 63.

In the current embodiment, the coil length of each of the coil sub-sets is approximately an eighth of the length of a coil set for an equivalent electric motor having three coil sets that have a number of coil sub-sets connected in series, such as that shown in FIG. 1.

FIG. 7 illustrates the electric motor shown in FIG. 6, where each control device bridge inverter is coupled to their respective coil sub-sets to form a wye configuration.

FIG. 8 illustrates the electric motor shown in FIG. 6, where each control device bridge inverter is coupled to their respective coil sub-sets to form a delta configuration.

As the coil sub-sets for each sub motor of the electric motor are not connected in series there is no need to run connecting wires around the periphery of the motor to provide serial interconnections between the different coil sets. Accordingly, less wire is required in the manufacturing the motor. This reduces manufacturing costs as well as reducing the complexity of the motor construction. The reduction in wire also reduces conduction losses.

By providing individual power control for the coils of each coil set, and by using a larger number of turns per coil than would be achievable using a motor in which the coils of each coil set are connected in series, the total inductance of the motor can be greatly increased. In turn, this allows far lower current to be passed through each coil sub-set whereby switching devices having a lower power rating can be used for current control. Accordingly, switching devices which are, cheaper, lighter and less bulky can be used to operate the motor.

The use of lower currents also reduces heat dissipation problems. The fact that smaller switching devices can operate at higher frequencies allows for finer and more responsive motor control. Indeed, torque adjustment can take place in a highly responsive manner, with adjustments being able to be made within a single PWM period. A typical PWM period according to an embodiment of the invention is approximately 50 (s.

Another advantage of the use of smaller switching devices is that they can be located proximal the coils which they control. Typically, when relatively large switching devices have been employed to control the operation of coil sub-sets connected in series, the control device is sufficiently large that it cannot be included with the other motor components (e.g. stator, rotor, etc.) but instead has been provided separately. In contrast, since small switching devices can be used, in accordance with an embodiment of this invention the switching devices and the control devices in which those switching devices are incorporated can be located in, for example the same housing/casing as the other motor components.

Each coil sub-set can include one or more coils. In this example, each coil sub-set includes three coils as is shown schematically in FIG. 8. In FIG. 8, these three coils are labelled 74A, 74B and 74C. The three coils 74A, 74B and 74C are alternately wound such that each coil produces a magnetic field which is anti-parallel with its adjacent coil/s for a given direction of current flow but having a common phase. As described above, as the permanent magnets of the rotor of the motor 40 sweep across the ends of the coils 74A, 74B and 74C, appropriate switching of the currents in the coils can be used to create the desired forces for providing an impulse to the rotor.

The reason that the coils 74A, 74B and 74C within each subset are wound in opposite directions to give antiparallel magnetic fields can be understood with respect to FIG. 10 which shows the arrangement of the magnets 242 on the rotor surrounding the coils 44, 46 and 48 of the stator. For simplicity, the arrangement is shown as a linear arrangement of magnets and coils, but it will be understood that in the embodiment of the invention described the coils will be arranged around the periphery of the stator with the magnets arranged around the inside of the circumference of the rotor, as already described.

The magnets 242 are arranged with alternate magnetic polarity towards the coil subsets 44, 46 and 48. Each subset of three coils 74A, 74B and 74C thus presents alternate magnetic fields to the alternate pole faces of the magnets. Thus, when the left-hand coil of a subset has a repelling force against a North Pole of one of the magnets, the adjacent central coil will have a repelling force against a South Pole of the magnets and so on.

As shown schematically in FIG. 10, the ratio of magnets to coils is eight magnets to nine coils. The advantage of this arrangement is that the magnets and coils will never perfectly align. If such perfect alignment occurred, then the motor could rest in a position in which no forces could be applied between the coils and the magnets to give a clear direction as to which sense the motor should turn. By arranging for a different number of coils and magnets around the motor, there would always be a resultant force in a particular direction whatever position the rotor and motor come to rest. Although the present embodiment describes a ratio of eight magnets to nine coils other ratios could be used, for example nine magnets to six coils.

Where individual power control is provided for each coil set (i.e. each sub motor), the associated control devices can be operated to run the motor at a reduced power rating. This can be done, for example, by powering down selected coil sets (i.e. powering down selected sub motors).

If selected coil sets were to be powered down, the motor would still be able to operate, albeit with reduced performance. In this way, the power output of the motor can be adjusted in accordance with the requirements of a given application. In one example, where the motor is used in a vehicle such as a car, powering down of some of the coil sets can be used to adjust the performance of the car. Similarly, if a fault were to occur with one of the sub motors resulting in the sub motor being powered down, the electric motor would continue to operate using the remaining sub motors, thereby allowing the vehicle to continue operation.

Indeed, powering down of one or more of the coil sets has the further benefit that in the event of a failure of one of the coil sets, other coil sets in the motor 40 can be powered down resulting in continued operation of the motor 40 in a manner which retains a balanced magnetic field profile around the periphery of the motor for appropriate multiphase operation.

FIG. 11 shows an example of a control device 80 in accordance with an embodiment of this invention.

The control device 80 includes a first circuit board 83 and a second circuit board 82. Preferably the second board 82 is arranged to overlay the first circuit board 83, as illustrated in FIG. 11.

The first circuit board 83 includes a plurality of switches that are arranged to apply an alternating voltage across the respective coil sub-sets. The switches can include semiconductor devices such as MOSFETs or IGBTs. In the present embodiment the switches comprise IGBT switches.

As described above, the plurality of switches are configured to form an n-phase bridge circuit. Accordingly, as is well known to a person skilled in the art, the number of switches will depend upon the number of voltage phases to be applied to the respective sub motors. In the present embodiment, in which the control devices and coil sub-sets are configured to form a three phase motor, the first circuit board 83 of the respective control devices include six switches. Although the current design shows each sub motor having a three phase construction, the sub motors can be constructed to have two or more phases.

The wires (e.g. copper wires) of the coil sub-sets can be connected directly to the switching devices as appropriate.

To aid heat dissipation, the first circuit board 83 is preferably manufactured from a material having a relatively high thermal conductance, for example metal, that aids the removal of heat away from the switches. As material having a high thermal conductance typically also have a high electrical conductance it is preferable for materials having a relatively high electrical conductance to have an insulating layer applied to portions of the first circuit board 83 to minimize the risk of short circuits occurring.

The second circuit board 82 includes a number of electrical components for controlling the operation of the switches mounted on the first circuit board 83. Examples of electrical components mounted on the second circuit board 82 include control logic for controlling the operation of the switches for providing PWM voltage control and interface components, such as a CAN interface chip, for allowing the control device 80 to communicate with devices external to the control device 80, such as other control devices 80 or a master controller. Typically the second control board 82 will communicate over the interface to receive torque demand requests and to transmit status information.

As mentioned above, the second circuit board 82 is arranged to be mounted on top of the first circuit board 83, where the first circuit board 83 and the second circuit board include means for being mounted within the motor 40, for example, adjacent to the coil sub-set which they control, directly to a cooling plate. In the illustrated example, these means include apertures 84 through which screws or suchlike can pass. In this example, the first circuit board 83 and the second circuit board 82 are substantially wedge-shaped. This shape allows multiple control devices 80 to be located adjacent each other within the motor, forming a fan-like arrangement. By separating the control logic from the switches this has the advantage of thermally isolating the control logic from the switches while also minimizing the impact of any electrical noise generated by the switches.

Also mounted on each of the circuit boards is a sensor that can be used for determining the position of the rotor 240, for example a hall sensor that is arranged to generate an electrical signal dependent upon the relative position of the focusing ring and magnets 227 that is mounted on the rotor 240. To determine the direction that the rotor is turning in the circuit boards preferably have two sensors that are offset by a predetermined angle so that the changes in signal from each of the sensors can be analyzed to determine both the relative position of the rotor 240 and the direction of rotation of the rotor. To allow each control device, and hence each sub motor, to operate independently of each other each circuit board has their own set of position sensors. However, a single set of position sensors could be used.

FIG. 12 illustrates six switches of the first circuit board arranged in an 3 phase bridge configuration that are coupled to the coil sub-sets of a coil set that are placed in a wye configuration. The six semiconductor switches are connected to a voltage supply, for example 300 volts, and to ground. Pairs of the respective coil sub-sets are connected between two legs of the bridge circuit. Simplistically, to operate the motor and supply a voltage in one direction, the switches are operated in pairs, one in the top half of the bridge and one from a different leg in the bottom half of the bridge. Each switch carries the output current for one third of the time.

To change the direction of rotation of the motor, the timing and polarity of the current flow in the coil is changed to cause the resulting forces in the opposite direction. As described above, the technique of pulse width modulating is used to pulse width modulate the signal applied to the gate of the semiconductor switches to control the voltage applied to the coils, where the PWM voltage is determined based upon a received torque demand request. The PWM voltage in turn determines the coil current and hence the produced torque.

As each sub motor of an in-wheel electric motor operates independently of the other sub motors (i.e. the sub motors are not serially connected), to improve torque balance between the respective sub motors a common control device can be located within the in-wheel electric motor for monitoring and adjusting the operation of the respective sub motors to balance the operation of the respective sub motors.

Alternatively, the balancing and synchronization of the respective sub motors can be performed by one or more of the sub motor control devices 80, where the in-wheel electric motor control devices 80 communicate between each other via the communication bus.

In a vehicle incorporating a plurality of wheels each having an in-wheel electric motor 40, each motor incorporates all the intelligence needed to manage its actions. Each motor understands its position on the vehicle and controls its actions accordingly. Preferably, each motor is further provided with information regarding the other motors such as the speed, torque and status and are based on each motor's knowledge of its position on the vehicle and the state and status of the other motors it can determine the optimum level of torque that it should apply for a given demanded torque. Even without this other information, though, the motor can continue to respond to a demanded torque.

Other control signals such as power up/power down control signals can also be sent/received to/from a master controller that is arranged to control the overall operation of the vehicle to which the respective in-wheel electric motors are mounted. The control signals are communicated to the respective control devices 80 for an in-wheel electric motor either directly or indirectly via a common control device. As described above, the control signals will typically be communicated via the communication bus, for example a CAN bus. However, as would be appreciated by a person skilled in the art, the signals can be communicated by any suitable means. The control signals can also include signals for adjusting/defining the voltage pulses applied by the control device 80 to the coils of its associated coil sub-set for powering the motor and thereby adjust the torque demand for the in-wheel electric motor.

The control device 80 can also optionally include means for monitoring a temperature within the motor, for example within the coils sub-set associated with that control device 80. The control device can be configured automatically to respond to the temperature measurement to, for example, reduce power to the coils sub-set to avoid overheating. Alternatively, the temperature measurement can be passed onto a common control device or master controller from each control device 80, whereby the common control device or master controller can monitor the overall temperature within the motor and adjust the operation of the control devices 80 accordingly.

As stated above, each electrical signal generated to drive the different coil sub-sets, within a given coil set, have a different phase angle. Each electrical signal generated by different circuit boards has substantially the same phase angle as corresponding electrical signals generated by other circuit boards. For example, for a three phase motor, where each sub motor includes a coil set having three coil sub-sets, each sub motor will generate an electrical signal having a first phase angle that is substantially the same for each sub motor. Similarly, each sub motor in a three phase motor will also generate electrical signals having a second and third phase angle, where the second and third phase angles are substantially the same between the sub motors.

The phase angle and voltage envelope for each of the different electrical signals are generated by the respective circuit boards using PWM voltage control, where the voltage envelope and phase angle of the electrical signals is determined by the modulating voltage pulses.

However, to minimize DC link capacitance and electromagnetic noise, the PWM voltage signals generated by each sub motor for electrical signals having a voltage envelope with substantially the same phase angle are offset with respect to each other. That is to say, even though the voltage envelope for different signals generated by different sub motors is substantially the same, the PWM signal used to generate these voltage signals are offset with respect to each other.

To achieve the PWM offset between different sub motors, PWM counters for each of the different sub motors are synchronized and an offset synchronous signal is generated for the counters on the different circuit boards, where the offset synchronous signal is different for each circuit board (i.e. for each sub motor). This has the effect of phase shifting the PWM voltage for each corresponding electric phase signal provided by each circuit board. Accordingly, even though the voltage envelope for different voltage signals generated by the circuit boards will have substantially the same phase angle, the PWM signals used to generate these voltage signals do not have substantially the same phase angle, thereby helping to minimize DC link capacitance and electromagnetic noise.

The invention claimed is:

1. An electric motor comprising a stator having two coil sets arranged to produce a magnetic field of the motor, each coil set comprising a plurality of coil sub-sets, wherein the two coil sets are without an electrical connection therebetween so that current flow in the coil sub-sets of one coil set is independent of current flow in the coil sub-sets of the other coil set; and first and second control device mounted on the stator within a casing of the motor, wherein the first control device is coupled to the plurality of coil sub-sets for the first coil set and the second control device is coupled to the plurality of coil sub-sets for the second coil set, wherein each control device includes a plurality of inverter switches and control logic for controlling the operation of the plurality of inverter switches for controlling current in the respective plurality of coil sub-sets to generate a magnetic field in each coil sub-set to have a substantially different magnetic phase to the other one or more coil sub-sets in the respective coil set; and wherein the first control device and the second control device are mounted on the stator adjacent to the respective plurality of coil sub-sets.

2. An electric motor according to claim 1, wherein each coil set includes three coil sub-sets.

3. An electric motor according to claim 1, wherein the first control device and second control device are arranged to drive each of the coil sub-sets with a different voltage phase.

4. An electric motor according to claim 3, wherein the first control device and second control device are arranged to control the voltage to each coil sub-set using pulse width modulation.

5. An electric motor according to claim 3, wherein the first control device and second control device include six inverter switches arranged as a three phase bridge for controlling the voltage provided to the respective coil sub-sets.

6. An electric motor according to claim 1, wherein for the first control device and the second control device the plurality of inverter switches is mounted on a first circuit board and the control logic is mounted on a second circuit board that is arranged to control the operation of the plurality of inverter switches on the first circuit board to provide a voltage to the coil sub-sets.

7. An electric motor according to claim 1, further comprising a sensor arranged to detect the position of a rotor of the electric motor to generate a position signal, wherein the first control device and second control device are arranged to control voltage to the respective coil sub-sets using the position signal.

8. An electric motor according to claim 7, wherein the rotor includes a plurality of magnets, wherein the sensor is arranged to determine the position of the rotor by detecting the position of the magnets.

9. An electric motor according to claim 1, wherein each control device includes a sensor arranged to detect the position of a rotor of the electric motor to generate a position signal, wherein each control device is arranged to control voltage to the respective coil sub-set using the respective position signal.

10. An electric motor according to claim 1, wherein each control device includes a plurality of sensors arranged to detect the position of a rotor of the electric motor to generate a position signal and direction of rotation of the rotor signal, wherein each control device is arranged to control voltage to the respective coil sub-set using the respective position and direction signal.

11. An electric motor according to claim 1, wherein the first control device and the second control device are arranged to receive a torque demand request and arranged to control current in the coil sub-sets based on the torque demand request.

12. An electric motor according to claim 1, wherein each coil sub-set includes a plurality of adjacent coils.

13. An electric motor according to claim 1, wherein the stator further comprises a heat sink with the first control device and the second control device being mounted on the heat sink.

14. An electric motor according to claim 1, wherein the first control device and the second control device are located adjacent their respective coil sub-sets within one or more apertures of the motor such that the control devices can be accessed one at a time.

15. An electric motor according to claim 1, wherein the first control device and second control device are coupled via a communication interface to allow the first control device and the second control device to communicate.

16. An electric motor according to claim 1, wherein the coil sets are mounted circumferentially around the axis of the stator at different angles around the axis with the respective control device being mounted to the stator at substantially the same angle as the respective coil set.

17. An electric motor according to claim 1, wherein the control devices are arranged so that the magnetic field in each coil sub set is generated using pulse width modulation voltage control.

18. An electric motor according to claim 17, wherein the control devices are arranged so that the magnetic phase angle of the magnetic field generated in the respective coil sub-sets of the first coil set is substantially the same as the magnetic phase angle of the magnetic field generated in the respective coil sub-sets of the second coil set.

19. An electric motor according to claim 18, wherein the control devices are arranged so that the pulse width modulation voltage signals used to generate the magnetic field in the first coil set are offset with respect to the pulse width modulation voltage control signal used to generate the magnetic field in the second coil set.

* * * * *